(12) United States Patent
Forslöw et al.

(10) Patent No.: US 9,242,633 B2
(45) Date of Patent: Jan. 26, 2016

(54) METHOD AND A CONTROL SYSTEM FOR CONTROLLING A WORK MACHINE

(75) Inventors: Daniel Forslöw, Billdal (SE); Reno Filla, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 683 days.

(21) Appl. No.: 12/595,846

(22) PCT Filed: May 10, 2007

(86) PCT No.: PCT/SE2007/000455
§ 371 (c)(1),
(2), (4) Date: Oct. 14, 2009

(87) PCT Pub. No.: WO2008/140359
PCT Pub. Date: Nov. 20, 2008

(65) Prior Publication Data
US 2010/0332061 A1    Dec. 30, 2010

(51) Int. Cl.
*B60W 10/26* (2006.01)
*B60K 6/28* (2007.10)
(Continued)

(52) U.S. Cl.
CPC ............ *B60W 10/26* (2013.01); *B60K 6/28* (2013.01); *B60K 6/46* (2013.01); *B60L 1/003* (2013.01); *B60L 1/20* (2013.01); *B60L 11/123* (2013.01); *B60W 10/06* (2013.01); *B60W 10/30* (2013.01); *E02F 3/434* (2013.01); *E02F 9/2045* (2013.01); *E02F 9/2075* (2013.01); *E02F 9/2091* (2013.01); *B60K 1/02* (2013.01); *B60L 2200/40* (2013.01); *B60L 2240/441* (2013.01); *B60L 2240/62* (2013.01); *B60L 2240/642* (2013.01);

(Continued)

(58) Field of Classification Search
CPC ..... B60W 10/26; B60W 10/06; B60W 10/30; E02F 9/2075; E02F 9/2045; E02F 9/2091; E02F 3/434; B06K 6/28; B06K 6/46; B60L 1/003; B60L 1/20; B60L 11/123
USPC .............. 701/22, 36, 50, 70; 180/65.1, 65.21, 180/65.22, 65.24, 65.265–65.51
See application file for complete search history.

(56) References Cited

U.S. PATENT DOCUMENTS 5,778,326 A * 7/1998 Moroto et al. ................. 701/22
5,832,396 A * 11/1998 Moroto et al. ................. 701/22
(Continued)

FOREIGN PATENT DOCUMENTS

EP    0829389 A2    3/1998
EP    1086848 A2    3/2001
(Continued)

OTHER PUBLICATIONS

International Search Report for corresponding International Application PCT/SE2007/0000455.
(Continued)

*Primary Examiner* — John Q Nguyen
*Assistant Examiner* — Nadeem Odeh
(74) *Attorney, Agent, or Firm* — WRB-IP LLP

(57) ABSTRACT

A method is provided for controlling a work machine during operation in a repeated work cycle including controlling transfer of power to and from an energy storage arrangement in the work machine according to a predetermined control strategy, which is adapted for the characteristics of the work cycle.

27 Claims, 7 Drawing Sheets

(51) Int. Cl.
 B60K 6/46    (2007.10)
 B60L 1/00    (2006.01)
 B60L 11/12   (2006.01)
 B60W 10/06   (2006.01)
 B60W 10/30   (2006.01)
 E02F 3/43    (2006.01)
 E02F 9/20    (2006.01)
 B60K 1/02    (2006.01)
 B60W 20/00   (2006.01)

(52) U.S. Cl.
 CPC ............ B60L 2240/70 (2013.01); B60W 20/00 (2013.01); B60W 2510/0638 (2013.01); B60W 2540/10 (2013.01); B60W 2540/12 (2013.01); B60W 2550/142 (2013.01); B60W 2550/402 (2013.01); B60W 2710/0644 (2013.01); B60Y 2200/14 (2013.01); B60Y 2200/415 (2013.01); Y02T 10/6217 (2013.01); Y02T 10/7077 (2013.01); Y02T 10/7291 (2013.01); Y02T 90/16 (2013.01); Y02T 90/162 (2013.01)

(56) References Cited

U.S. PATENT DOCUMENTS

| | | | | |
|---|---|---|---|---|
| 6,076,030 | A * | 6/2000 | Rowe | 701/50 |
| 6,314,347 | B1 * | 11/2001 | Kuroda et al. | 701/22 |
| 6,344,732 | B2 * | 2/2002 | Suzuki | 320/132 |
| 6,487,477 | B1 * | 11/2002 | Woestman et al. | 701/22 |
| 6,507,127 | B1 * | 1/2003 | Amano et al. | 290/40 C |
| 6,745,117 | B1 * | 6/2004 | Thacher et al. | 701/50 |
| 6,856,866 | B2 * | 2/2005 | Nakao | 701/22 |
| 6,965,826 | B2 * | 11/2005 | Andres et al. | 701/115 |
| 2006/0092033 | A1 * | 5/2006 | Hoff et al. | 340/679 |
| 2007/0080236 | A1 * | 4/2007 | Betz et al. | 237/12.1 |
| 2008/0223631 | A1 * | 9/2008 | Filla et al. | 180/65.1 |
| 2008/0270023 | A1 * | 10/2008 | Kumar | 701/207 |
| 2010/0154399 | A1 * | 6/2010 | Bergstrom et al. | 60/327 |

FOREIGN PATENT DOCUMENTS

| | | |
|---|---|---|
| EP | 1136311 A2 | 9/2001 |
| EP | 1211121 A2 | 6/2002 |
| EP | 1256476 A2 | 11/2002 |
| JP | 11008909 A | 1/1999 |
| JP | 2000188802 A | 7/2000 |
| JP | 2006094628 A | 4/2006 |

OTHER PUBLICATIONS

International Preliminary Report on Patentability corresponding International Application PCT/SE2007/000455.

* cited by examiner

METHOD AND A CONTROL SYSTEM FOR CONTROLLING A WORK MACHINE

BACKGROUND AND SUMMARY

The present invention relates to a method and a system for controlling a work machine.

The term "work machine" comprises different types of material handling vehicles like construction machines, such as a wheel loader and a dump truck (such as an articulated hauler). A work machine is provided with a bucket, container or other type of work implement for carrying/transporting a load. Further terms frequently used for work machines are "earth-moving machinery", "off-road work machines" and "construction equipment".

In connection with transportation of heavy loads, e.g. in contracting work, work machines are frequently used. A work machine may be operated with large and heavy loads in areas where there are no roads, for example for transports in connection with road or tunnel building, sand pits, mines and similar environments.

A work machine is often used in a repeated work cycle. The term "work cycle" comprises a route of the work machine (ie the work cycle travel path) and a movement of a work implement, such as a bucket, (lifting/lowering operation). The work cycle is repeated in the same geographical area. During the performance of the work cycle, the work machine often encounters different gradients of the ground (uphill and downhill), and turns (cornering).

According to a first work cycle example, a wheel loader typically drives into a heap of material, lifts the bucket, reverses out of the heap, turns and is forwarded towards a dump truck where it unloads the material onto the container of the dump truck. After unloading, the wheel loader returns to the starting position.

A second work cycle example for a wheel loader is the so called "load & carry cycle" with a small ramp at the end. According to this example, material is collected in the bucket, the wheel loader is reversed, turned and forwarded a longer distance (100-400 meters) to a crusher or conveyor belt, which is located on top of the ramp, and the bucket is emptied. The wheel loader is thereafter driven back again.

According to a third work cycle example, a dump truck is loaded at a first position, driven along a varied route, unloaded at a second position and driven back along the varied route. Normally, an excavator or wheel loader loads the container of the dump truck at the first position.

The invention will be described below for a wheel loader. This should be regarded as a non-limiting example of a work machine. The wheel loader comprises a powertrain for propelling the machine via the wheels. A power source, such as an internal combustion engine, and especially a diesel engine, is adapted to provide the power for propelling the wheel loader. The wheel loader further comprises a hydraulic system for performing certain work functions, such as lifting and tilting a work implement and steering the machine. The power source is also adapted to provide the power for controlling the hydraulic work functions. More specifically, one or more hydraulic pumps are driven by the power source in order to provide hydraulic actuators (such as hydraulic cylinders) with pressurized hydraulic fluid.

The invention is particularly directed to a hybrid electric wheel loader. A hybrid electric wheel loader comprises an energy storage means, such as a battery or a capacitor (preferably a super capacitor). A problem is to control a state of charge (SOC) of the energy storage means during operation in an efficient way in order to optimize energy recovery and reduce fuel consumption.

It is desirable to optimize energy recovery and/or reduce fuel consumption of a work machine during operation.

According to an aspect of the present invention, a method is provided for controlling a work machine during operation in a repeated work cycle comprising the step of controlling transfer of power to and from an energy storage means in the work machine according to a predetermined control strategy, which is adapted for characteristics of the work cycle.

The work cycle characteristics may regard a work machine internal characteristic, such as a work machine behaviour, and/or an external characteristic, such as a work cycle travel path direction. More specifically, the characteristics may comprise a predicted and/or experienced sequence of events that takes place during performance of the work cycle and which is relevant for the control of the work machine.

Knowledge of the work cycle creates conditions for reliably predicting forthcoming events (occurrences) in the work cycle and operating the power transfer to and from the energy storage means in an efficient way. Such work cycle knowledge may be achieved either from a previously performed lap of the specific work cycle and/or from pre-available information of the work cycle, such as topographical maps.

According to a preferred embodiment, the control strategy comprises information indicative of an amount of energy required for a certain portion of the work cycle. The information may regard for example a work machine behaviour, a work cycle travel path direction and/or a work implement operation. More specifically, the information may comprise a predicted and/or experienced sequence of events that takes place during performance of the work cycle and which is relevant for the control of the work machine. Each such event represents an important change in a work machine operational parameter, and each event is preferably associated to a position along the work cycle travel path. Therefore, according to a preferred example, the energy information is based on a change in a work cycle travel path. Preferably, the energy condition is based on a change of direction of a work cycle travel path in a horizontal plane and/or on a change of ground inclination of a work cycle travel path.

According to a further preferred embodiment, the method comprises the step of controlling power transfer to and from at least one power consuming system in the work machine. The power consuming system may comprise a powertrain for propelling the work machine and/or a hydraulic system for moving a work implement of the work machine.

According to a further preferred embodiment, the method comprises the step of determining at least one condition that is indicative of an amount of energy required for a certain portion of the work cycle, and establishing the energy control strategy on the basis of said energy condition.

The energy control strategy (or energy control model) is built up on the basis of the condition variation. More specifically, the condition variation is associated to a variation in the work machine operational characteristics. In other words, the sequence of events is built up in response to the predicted and/or experienced driving pattern along the work cycle route.

According to a further development of the last-mentioned embodiment, the method comprises the step of detecting at least one operational parameter during operation of a work machine in the work cycle in question, and determining the energy condition on the basis of a magnitude of the detected operational parameter.

Preferably, the method comprises the step of repeatedly detecting said at least one operational parameter. Further, a plurality of operational parameters is preferably detected, such as an operational parameter indicative of a change of direction of the work cycle travel path. Said at least one operational parameter is preferably substantially continuously repeatedly detected.

Thus, an event may be established on the basis of the detected operational parameter in a previously performed work cycle and used for controlling a work machine by means of the control strategy in a later performed work cycle. More particularly, an individual work machine may be adapted to learn from past experiences. For example, driving patterns with regard to steering wheel deflection, gas pedal operation, brake pedal operation, work implement operation etc are recognized and stored. Further, a traveling distance for the specific work cycle is detected and the time/position when lifting force is required are recognized and stored. According to one example, the control strategy is solely determined based on driving pattern information achieved from sensors in the work machine.

According to an alternative, or complementary embodiment, the method comprises the step of predicting at least part of the energy condition on the basis of pre-available information of the work cycle in question. Such information may be formed by geographical maps of the area covering the work cycle travel path, knowledge of the specific work cycle travel path (comprising turns and slopes), the material to be transported, ground conditions, weather conditions etc. For example, a global navigation satellite system (GNSS) (such as the GPS) may be used for establishing the work cycle travel path. According to further alternatives, radio, radar, ultrasound, laser scanning, image recognition, or gyroscope-based determination systems may be used.

According to one example, the control strategy is established on the basis of both detected operational parameters while performing the work cycle and available information of the work cycle in question. Thus, the work cycle route may be indicated in a topographical map, wherein turns and slopes are defined. The control strategy is based on such a topographical map and it may be modified based on detected operational conditions.

According to a further preferred embodiment, the control strategy comprises a plurality of control steps, wherein each step is established on the basis of the condition variation. Preferably, the work cycle travel path comprises a plurality of positions, wherein each position is established on the basis of the condition variation.

Each control step indicates that the work machine should be effected for an optimum control. Such a control step may be indicated by the position of a change in altitude, or a change in direction, of the work cycle travel path.

It is also desirable to achieve a system adapted for an optimized energy recovery and/or reduced fuel consumption of a work machine during operation.

According to an aspect of the present invention, a system is provided for controlling a work machine during operation in a repeated work cycle comprising means for controlling transfer of power to and from an energy storage means in the work machine in according to a predetermined control strategy, which is adapted for the characteristics of the work cycle.

Other advantageous embodiments of the invention and its associated advantages are apparent from the following description.

BRIEF DESCRIPTION OF THE DRAWINGS

The invention will be explained below, with reference to the embodiments shown on the appended drawings, wherein FIG. 1 schematically shows a hybrid electric wheel loader in a side view, FIG. 2 schematically shows a first exemplary embodiment of a powertrain and a hydraulic system of the wheel loader in FIG. 1, FIG. 3 schematically shows a first exemplary embodiment of a control system associated to the powertrain and hydraulic system of FIG. 2.

DETAILED DESCRIPTION

Figure 1:
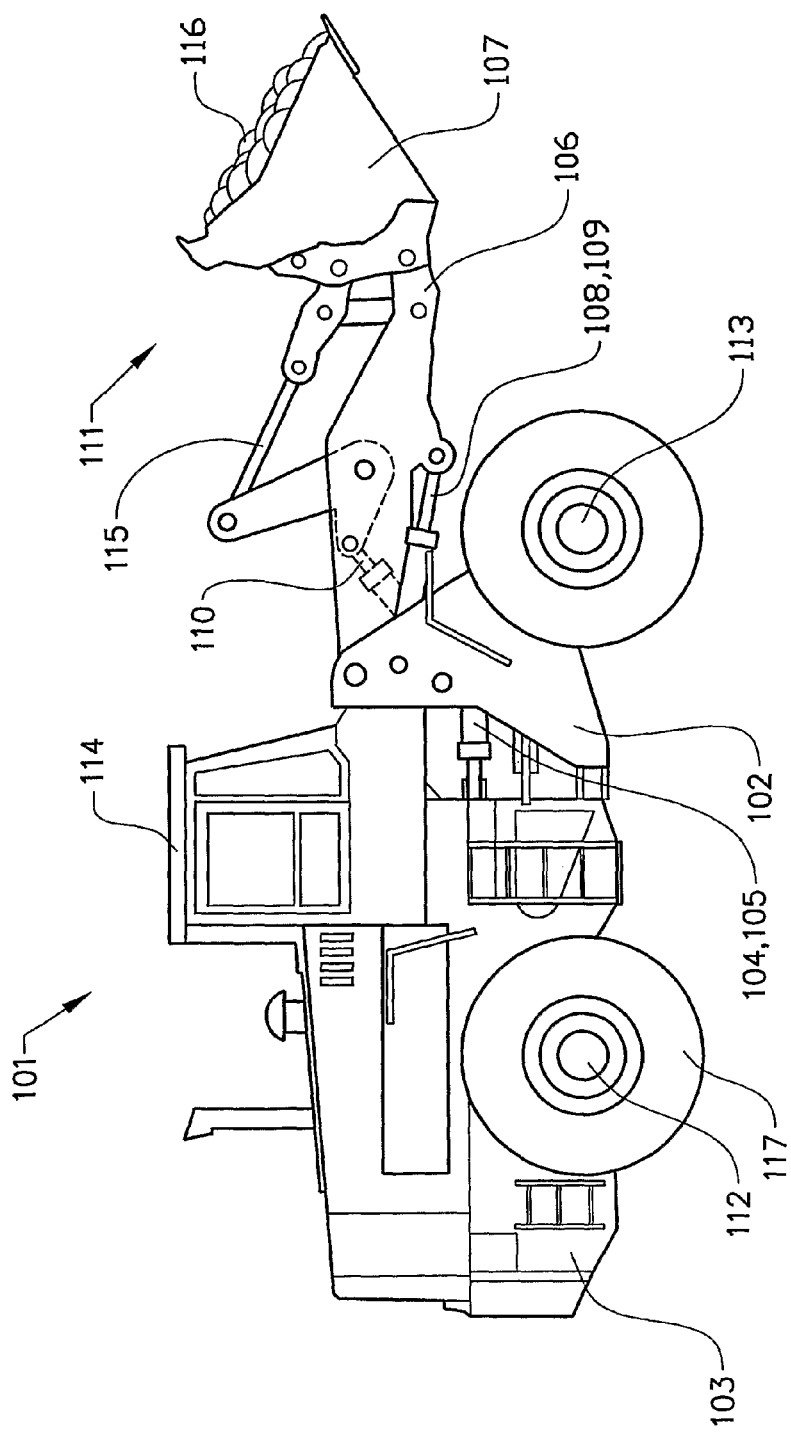

FIG. 1 shows a frame-steered work machine constituting a wheel loader 101. The body of the wheel loader 101 comprises a front body section 102 and a rear body section 103, which sections each has an axle 112,113 for driving a pair of wheels. The rear body-section 103 comprises a cab 114. The body sections 102,103 are connected to each other in such a way that they can pivot in relation to each other around a vertical axis by means of two first actuators in the form of hydraulic cylinders 104,105 arranged between the two sections. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
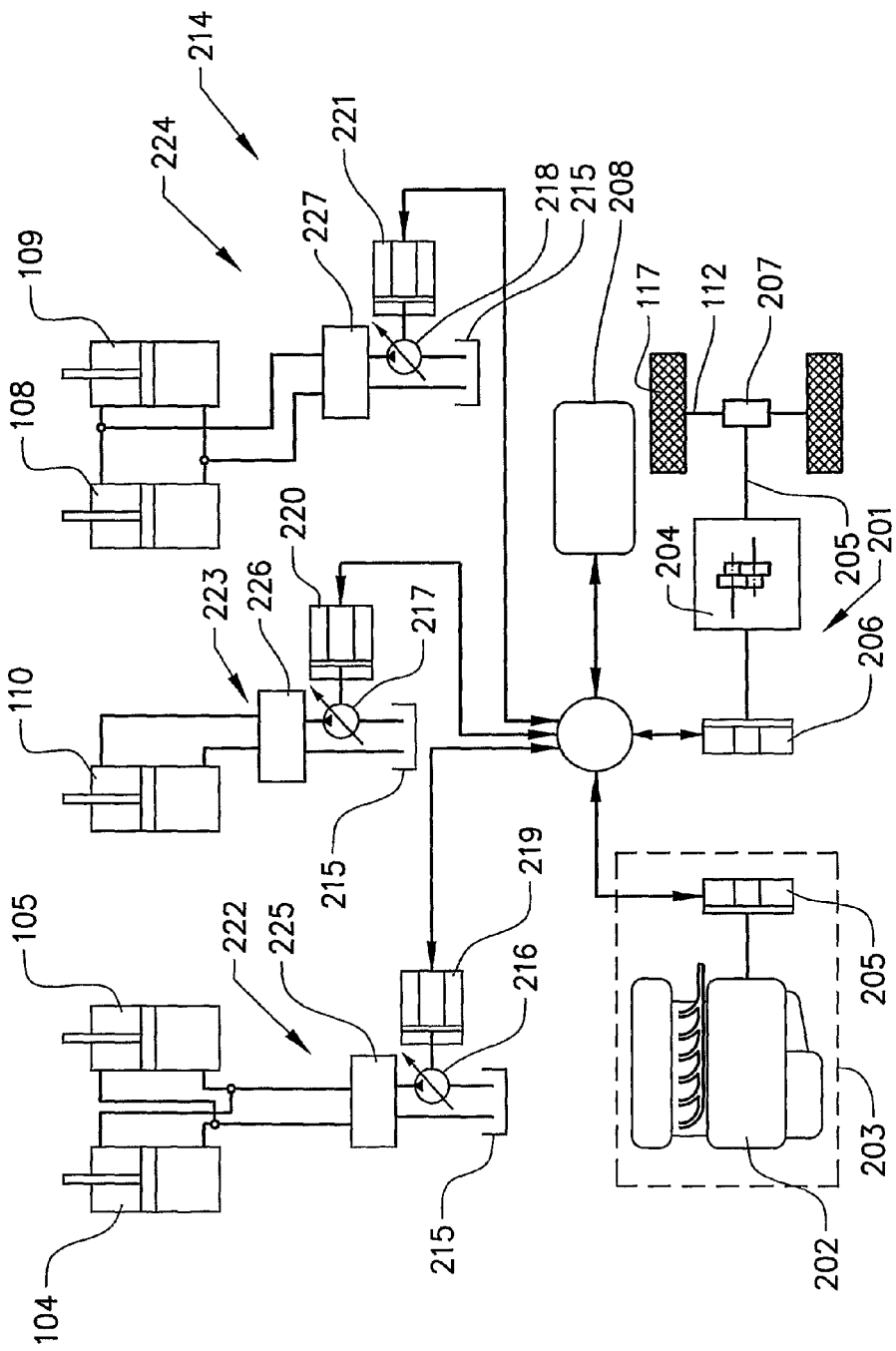

FIG. 2 schematically shows a first embodiment of a powertrain 201 and a hydraulic system 214. The powertrain 201 comprises a diesel engine 202, a gear box 204 and a transverse axle 112.

The powertrain 201 is a series hybrid powertrain. The powertrain 201 comprises two electric machines 205,206 for driving and braking the driving wheels. The electric machines 205,206 are further adapted for powering at least one further electric machine 219,220,221 associated to a hydraulic pump 215,216,217 in the hydraulic system 214. The electric machines 205,206 are further connected to an energy storage means 208, such as a battery or a super capacitor.

A first electric machine 205 is connected to an output shaft of the internal combustion engine 202 and functions as a generator. Thus, the diesel engine 202 and the generator 205 together form a power generator 203. A second electric machine 206 is connected to the wheels and functions as a motor. In this example, the second electric machine 206 is connected to an input shaft of the gear box 204. The electric machines 205,206 are electrically connected to each other for transmitting torque from the internal combustion engine 202 to the driving wheels via the first and second electric machines 205,206.

In this example, one hydraulic pump is arranged for each implement and/or steering function. Thus, the hydraulic system 214 comprises three hydraulic pumps 216,217,218; a first hydraulic pump 218 is arranged to provide a lifting and lowering function of the implement, a second hydraulic pump 217 is arranged to provide a tilting function of the implement, and a third hydraulic pump 216 is arranged to provide the steering function of the working machine. By separate hydraulic pumps for these functions the operation of the working machine can be further optimized and thus the total energy consumption can be lowered.

Thus, each hydraulic pump 216,217,218 is provided with an electric machine 219,220,221. The electric machines 205, 206 in the powertrain can be connected directly to the electric machines 219,220,221 in the hydraulic system as well as connected to the electric energy storage means 208 $t$ which in turn is connected to the electric machines 219,220,221. The electric energy storage means 208 is adapted for storing energy and providing energy to the electric machines 205, 206,219,220,221.

Each hydraulic pump 216,217,218 is provided in a separate hydraulic circuit t 222,223,224 for each work function. A number of electronically controlled valve units may be hydraulically connected between each pump 216,217,218 and the cylinders 104,105,1081109,110 for regulating the reciprocating work of the cylinders.

Each of the systems of hydraulic valve units is, for ease of presentation, represented by a single box 225,226,227.

The arrows in FIG. 2 illustrate ways of transfer of 30 power between the different components.

Figure 3:
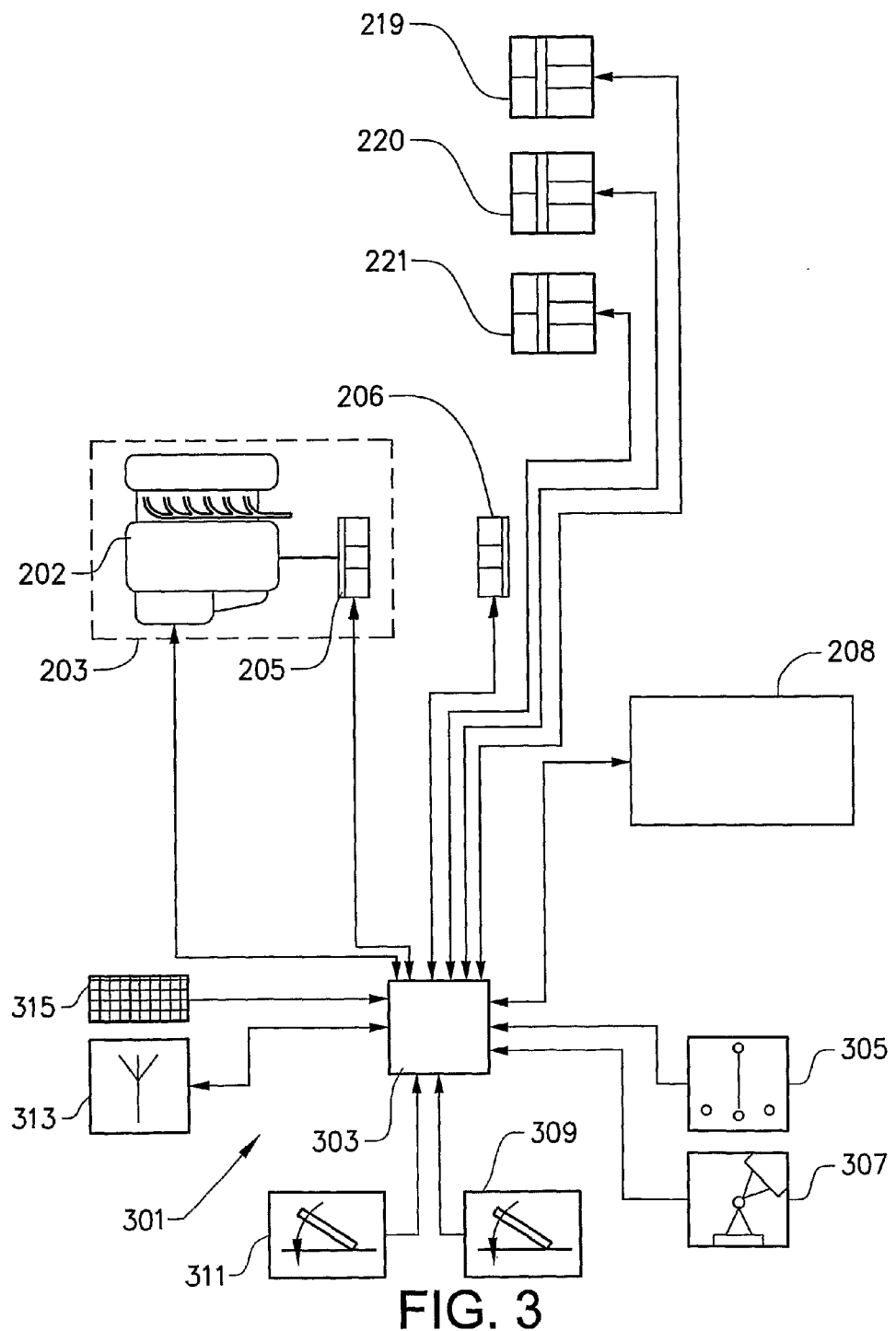

FIG. 3 shows a first exemplary embodiment of a control system 301 for controlling the wheel loader 101. The control system 301 comprises a control unit 303 with software for controlling the wheel loader 101. The control unit 303 forms a means connected to the energy storage means 208 for controlling transfer of power to and from the energy storage means according to an established control strategy, see further below.

The arrows in FIG. 3 illustrate control information transmission between the different components.

In other words, the control system 301 utilizes the power generator 203 to generate electrical power which is coupled through the electrical power controller 303 to either a traction motor 206, a pump motor 219,220,221 or the energy storage means 208.

The control unit 303 is further adapted for controlling the speed of the engine 202 via known control means, such as via a fuel pump. The control unit 303 receives information concerning the required speed of the engine from a sensor 309, which detects the position of a throttle pedal and generates a signal with information about the position of the throttle pedal to the control unit 303. The engine speed is thus increased with increased depression of the throttle pedal.

The control system comprises means 305,307,313,315 for determining at least one condition that is indicative of an amount of energy required for a certain portion of the work cycle.

A steering angle sensor 307 is adapted to detect the steering angle of the vehicle, ie the inclination between the two vehicle parts 102,103 with regard to a vertical axis and generates a corresponding signal for input to the controller 303. Such a sensor may be constituted by a linear sensor arranged for detecting an extension of one of said steering cylinders 104, 105, or a rotary sensor positioned at the steering joint. Thus, the sensor 307 is adapted to detect a change of direction of the travel path in a horizontal plane. Alternatively, the steering angle sensor may be adapted for detecting a turning amount of a steering wheel or deflection of a steering lever.

An inclination sensor 305 determines the inclination of the horizontal longitudinal axis of the work machine and generates a corresponding signal for input to the controller 303. Thus, the inclination sensor 305 is adapted to detect a ground inclination of the travel path. According to an alternative, an accelerometer system may be used for determining inclination, for example comprising two uniaxial accelerometers, or a single dualaxial accelerometer.

The sensors mentioned above are known per se to a man skilled in the art of work machine powertrains so their structure need not be explained here.

The control system 301 further comprises a means 313 for establishing a position of the working machine 101. The positioning means 313 forms a vehicle location sensor and is constituted by an antenna and is adapted to communicate with external means, such as satellites 702, see FIG. 7, for establishing the work machine position. The control system 301 uses a global navigation satellite system such as the GPS, GLONASS, or Gallileo. According to an alternative to GPS, the position is determined via stationary radio buoys, preferably via a triangulation procedure. According to a further alternative, a pattern recognition system, such as neural network, may be used. In this way, the control strategy is based on experience from one or several laps of the work cycle that more (or less) energy is required for certain work cycle parts (positions/times) without any need to associate these parts to any geographical positions.

The control system 301 further comprises a geographical map means 315, such as a map data base. The map database 315 may comprise topographic information such as the elevation associated with each of the nodes on the work cycle route, from which an associated potential energy difference can be calculated for different locations along the route in the map.

The control unit 303 is commonly known as an Electronic Control Unit (ECU), a Central Processing Unit (CPU) or an Electronic Control Module (ECM) for an electronic control of the vehicle operation. In a preferred embodiment, the control unit comprises a microprocessor. The control unit 303 comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

Figure 4:
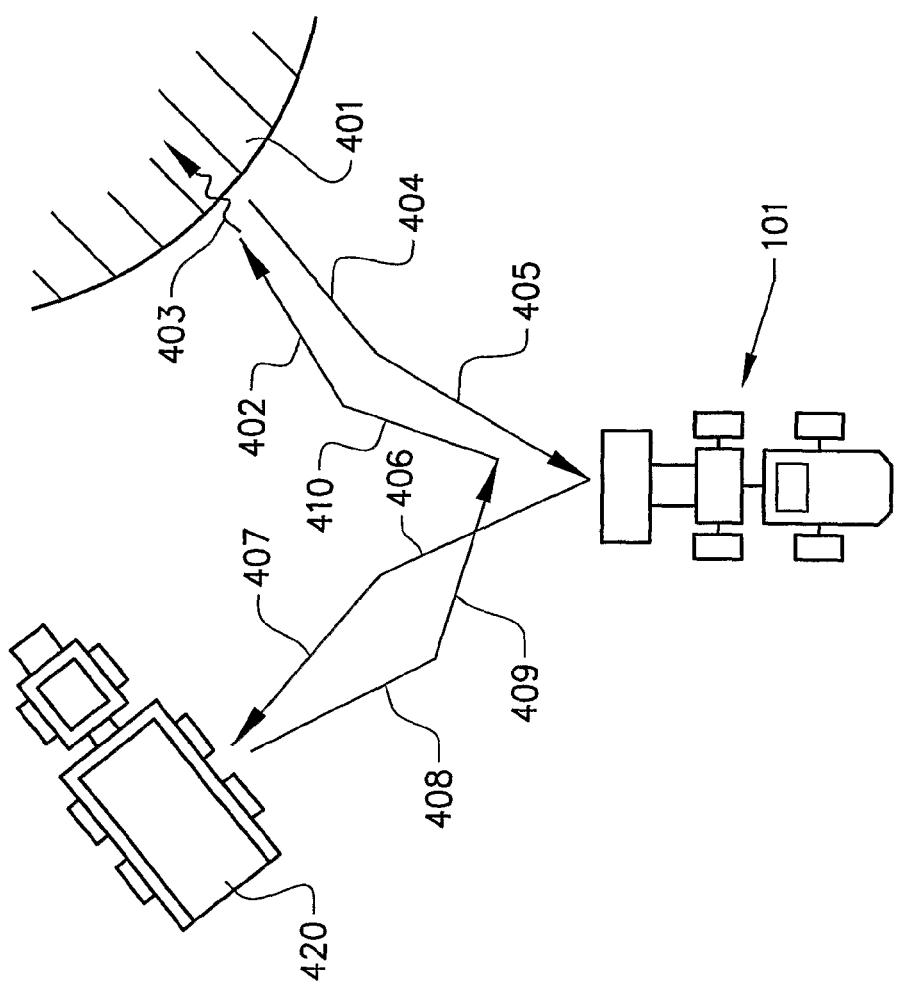
FIG. 4 illustrates a short cycle loading with the wheel loader in a view from above.

With reference to FIG. 4, a work cycle in the form of so-called short-cycle loading for the wheel loader 101 is shown. The short-cycle loading is characterized in that the longest distance that the vehicle travels between a loading and an unloading position does not exceed a certain number of meters, in this case of the order of 15 meters. More specifically, the wheel loader 101 is used to scoop up material from the loading position (excavating a natural ground 401) with the bucket 107 and unload it in the unloading position (onto a container of a dump truck 420 in the form of an articulated hauler).

FIG. 4 shows a driving pattern comprising a series of steps from excavation to loading onto the dump truck 420. Specifically, the wheel loader 101 travels forward, see arrow 402, to the natural ground 401 in for example a forward second speed gear. The wheel loader is in a straight position, wherein the front and rear vehicle parts are in line. When it approaches the natural ground 401, it thrusts into the natural ground in for example a forward first speed gear in order to increase tractive force, see arrow 403. The lifting arm unit is raised, wherein the bucket 107 is filled with material from the natural ground.

When the excavation is finished, the wheel loader 101 is retreated from the excavating operation position at a high speed in for example a reverse second speed gear, see arrow 404 and the wheel loader is turned to the right (or to the left), see arrow 405. The wheel loader 101 then moves forward, see arrow 406, while turning hard to the left (or right), then straightens out the vehicle to travel to approach the dump truck 420 at a high speed, see arrow 407. The lifting arm unit 106 is raised, the bucket 107 tilted and the material is deposited on the container of the articulated hauler. When a loading operation of the dump truck 420 is finished, the wheel loader 101 moves away in reverse from the dump truck 420 at a high speed, see arrow 408, turns to a stop position and is driven forwards again 410 towards the natural ground 401.

Figure 5:
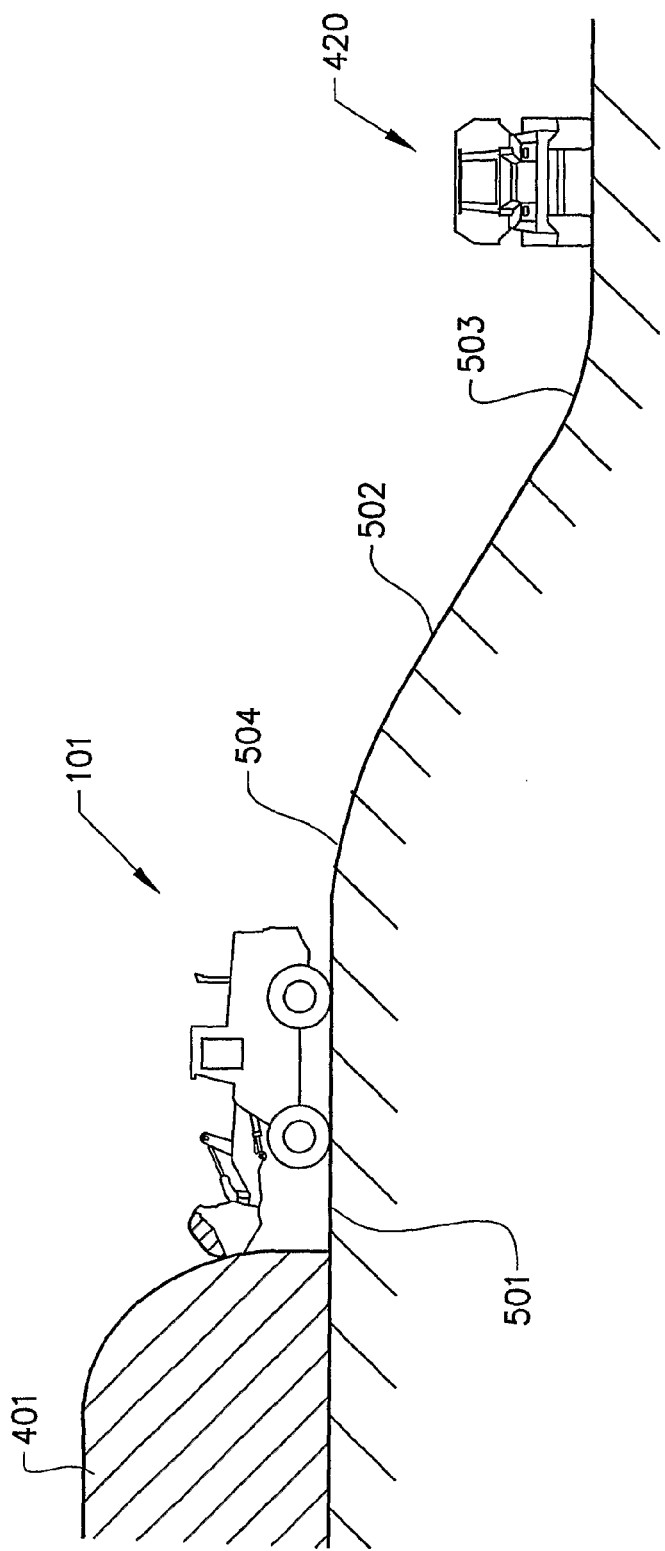
FIG. 5 illustrates a work cycle operation with the wheel loader in a side view.

With reference to FIG. 5, a further work cycle example is shown. This work cycle may be referred to as the "load & carry cycle" and comprises the steps described above with reference to FIG. 3. The wheel loader travels a longer distance between the loading and the unloading position in relation to the short cycle loading in FIG. 4. Further, the material is collected (scooped up) at a plateau 501 and delivered to the articulated hauler 420 at a lower position. The work cycle path comprises a steep portion 502 between the loading position and the unloading position. The starting point of the steep slope is indicated by reference numeral 503 and the finishing point of the steep slope is indicated by reference numeral 504.

During a first lap of the load carrying work cycle, a plurality of operational parameters are detected and recorded. Preferably, each detected operational parameter is indicative of a work machine behaviour. More specifically, any turns are detected by means of the steering angle sensor 307. The change 503, 504 of ground inclination is detected by means of the inclination sensor 305. Each of the detected operational parameters forms an input signal and is sent to the control unit 303 and recorded in the memory of the control unit 303.

Further, the geographical position of the wheel loader is detected and associated to each of the detected events by means of the navigation system. Thus, the work cycle route is represented by a path on a geographical map.

A control strategy is established on the basis of the operational parameter information in the input signals. More specifically, each detected operational parameter information is analyzed and if it is deemed to be of such a magnitude that it should effect the wheel loader control in the work cycle, it is represented by a control event in the sequence of control events. In other words, a model, or map, is built of the work cycle comprising information of a plurality of events, each linked to geographical position.

In the example shown in FIG. 5, the steep uphill is recognized, both with regard to length and height, and the control strategy established so that a state of charge (SOC) of the energy storage means 208 is at a maximum level, preferably fully loaded, before the wheel loader enters the ramp. Further, after loading the bucket and before traveling downhill, the state of charge of the storage means is controlled to a minimum level, preferably empty. In this way, more energy may be recovered while traveling down the slope.

According to one example, responsive to a signal from the accelerator pedal 309 operated by the driver, the controller 303 controls the amount of power that is output from the traction motor 206 to the wheels. The power generator 203 and energy storage means 208 are controlled responsive to power demands from the traction motor 206 and responsive to the determined control strategy.

For example, the controller 303 continuously receives information about the amount of energy stored in the energy storage means 208 in determining and/or altering a particular overall control strategy.

Electrical power generated by the electric generator or alternator 205 and not required by the traction motor 206 to drive the work machine 101, or electrical power generated by the traction motor 206 from regenerative braking, can be stored in the energy storage means 208.

The energy storage means 208 may, for example, comprise a battery, an ultra-capacitor, a hydraulic accumulator or a flywheel (e.g. a flywheel in cooperation with an associated motor/generator).

Accordingly, the flow of fuel to the engine 202 can be shut off, reduced, or tapered down sufficiently far in advance of reaching a downhill so as to provide for recovering kinetic energy from the electrical machine 206 as electrical energy that is either stored in the energy storage means 208 or used to propel the work machine or for a lifting/lowering motion of the work implement. Furthermore, the residual energy stored provides for temporarily shutting off fuel during periods when the power generator is not needed, and then restarting the engine by simply resuming fuel flow thereto.

In other words, a difference between the power actually generated by the power generator 203 and the amount of power required to actually drive the work machine 101 can be accommodated by the associated energy storage means 208. For example, if the power generator 203 comprises an internal combustion engine 202 that is operated most efficiently at wide open throttle, then, under driving conditions for which the power output level of the power generator 203 was greater than that necessary to drive the work machine, either the excess power from the power generator 203 can be stored in the energy storage means 208, or, if there was sufficient stored energy in the energy storage means 208, the work machine could be operated strictly on energy from the energy storage means 208 without operating the power generator 203. Under driving conditions requiring more power than can be generated by the power generator 203, the work machine can be operated from energy stored in the energy storage means 208, and if necessary, power generated by the power generator 203. Accordingly, the control of the hybrid vehicle system involves determining whether or not, and if so, under what conditions, to run the power generator 203, whether to store energy in the energy storage means 208 or to utilize energy therefrom, and, particularly for the energy storage means, determining the target state of charge. The nature of the particular control strategy depends upon a variety of factors such as the ramp shown in FIG. 4.

Thus, the energy management system 303 can provide for reduced fuel consumption by shutting off the power generator 203 and running on stored energy form the energy storage means 208 during periods of relatively low to negative power demands by the work machine, and by operating the power generator 203 at relatively high efficiency, typically with relatively high power output, during periods when power is required from the power generator 203, and using excess power that may be generated by the power generator 203 under these conditions to charge the energy storage means 208.

Figure 6:
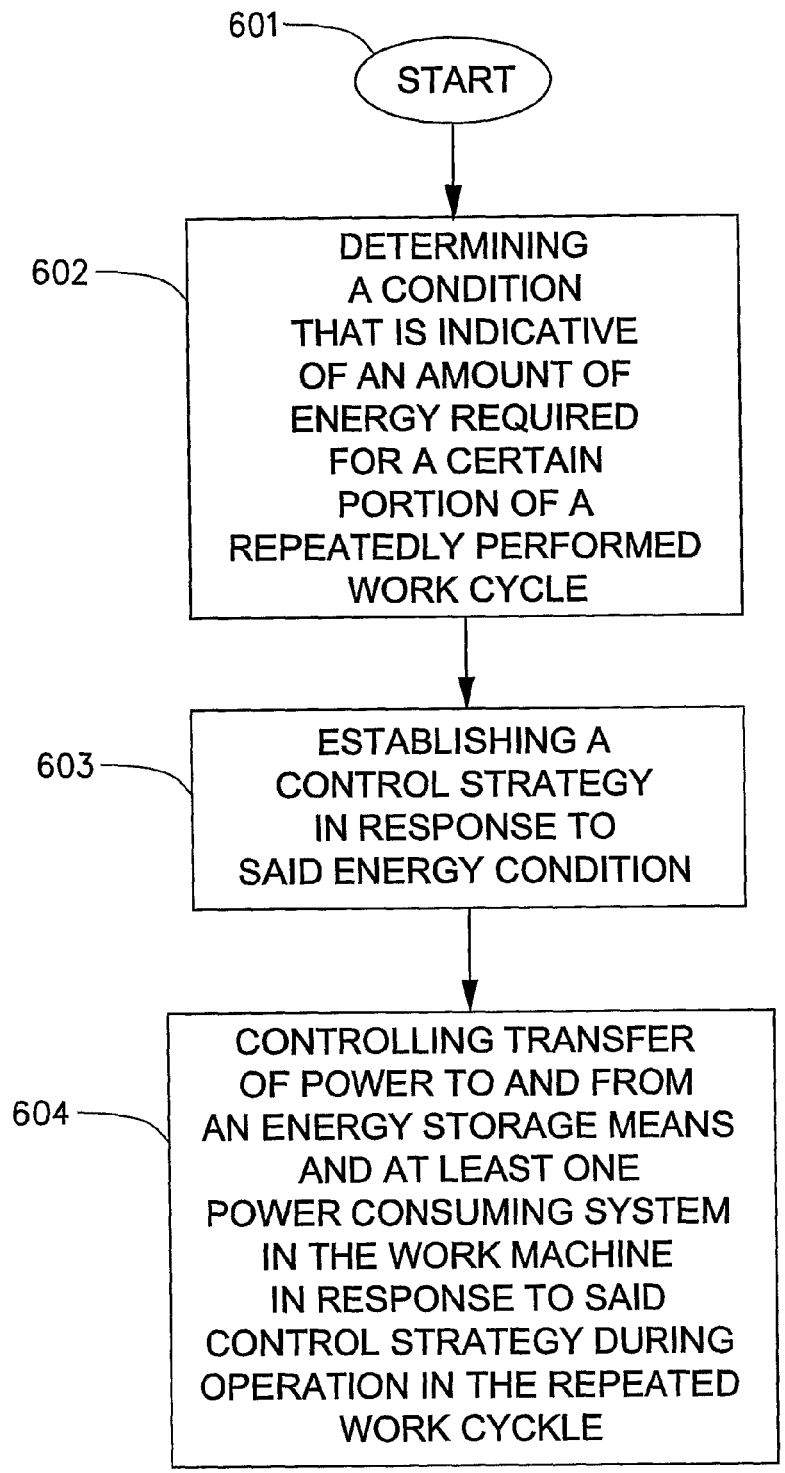
FIG. 6 illustrates a flow chart for a wheel loader control method.

FIG. 6 illustrates a summary of the steps for performing the method according to one example. The flow chart starts in block 601. The flow chart continues to block 602, which comprises the step of determining at least one condition that is indicative of an amount of energy required for a certain portion of a specific, repeated work cycle. The flow chart continues to block 603, which comprises the step of establishing a control strategy in response to the determined energy condition. Now, the work machine is ready to be operated in an efficient way in the specific work cycle. The flow chart then continues to block 604, which comprises the step of controlling transfer of energy between the energy storage means 208 and the power consuming system according to said established control strategy during operation in the repeated specific work cycle.

Figure 7:
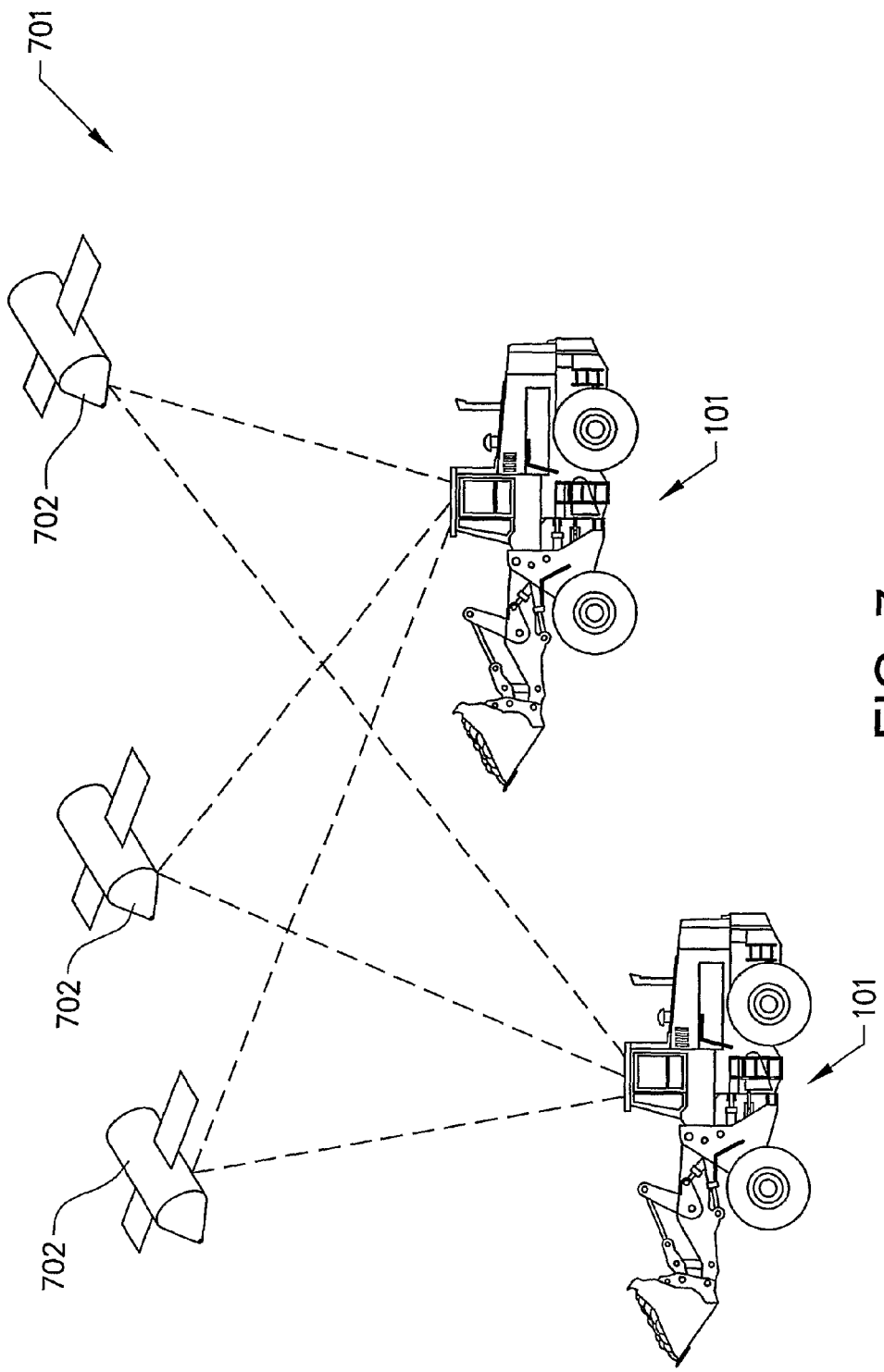
FIG. 7 illustrates a satellite based system for monitoring the wheel loader.

FIG. 7 illustrates a satellite based system 701 for monitoring the position of a plurality of wheel loaders. The system 701 is adapted for access to a plurality of satellites 702. Each wheel loader 101 is in communication with the satellites for location determination.

Several laps of the work cycle may be used for establishing the sequence of events. Further, information from several work machines may be used for establishing the control strategy. The plurality of work cycle laps for establishing the control strategy may be performed by a single work machine, or by different work machines. Thus, an established control strategy may be altered continuously in response to new information.

This may be important in cases where the ground conditions changes over time, if the weather changes (fall of rain, snow) etc. Further, an established control strategy may be altered according to individual characteristics of a specific work machine.

According to an alternative or complement method, the control strategy comprises information with regard to operating the work implement and the method comprising the step of controlling operation of the work implement. More specifically, the work implement information regards a work machine hydraulic system information and the method comprises the step of controlling the hydraulic system (especially the pump(s)). This alternative is particularly useful for work machines, where a substantial power is required for operating the work implement. This is the case in a wheel loader, see FIG. 1-5. More specifically, the control strategy may comprise information regarding power distribution between the energy storage means and the hydraulic system and the method comprises the step of controlling power distribution in the power transmission system in response thereto.

According to one example, it is detected where the heap of material is located. The state of charge of the energy storage means 208 is controlled to a high energy state before the lifting operation. The state of charge is preferably matched with regard to the power required for the loading and lifting operation. With reference to FIG. 5, the state of charge of the energy storage means 208 is controlled to such a state before entering the ramp that substantially all energy is consumed for the part of the work cycle comprising traveling up the ramp and loading and lifting the bucket. Further, energy may be recovered in the energy storage means when the bucket is lowered again.

According to a further alternative, the memory in the control unit 303 may comprise a plurality of control strategies, each associated to a specific work cycle.

The control unit 303 may be adapted to automatically recognize which work cycle the work machine is performing by detecting location and direction of the work cycle, and thereafter control the work machine according to the correct control strategy.

According to an embodiment, the position of the wheel loader is continuously monitored. In this way, any geographical deviation from the established work cycle path can be determined. In case of such a deviation, the established control strategy is disactivated. If the wheel loader enters the work cycle path again, the control strategy is again activated and the wheel loader is controlled accordingly.

The detected operational parameters during performance of the work cycle are not limited to work machine operating parameters, but may also comprise information of the surrounding area, especially the area ahead of the work machine along the work cycle travel path, such as slopes etc. Such external operational parameters may be detected via a camera or other means for reproduction of the area.

The power generator 203 comprises a prime mover in the form of a diesel engine, which generates mechanical power that is coupled to the electric generator or alternator 205 to generate the electric power. The prime mover could operate in accordance with any of a variety of thermodynamic cycles, for example an Otto cycle, a Diesel cycle, a Sterling cycle, a Brayton cycle, or a Rankine cycle. In another embodiment, the power generator 203 comprises a fuel cell that generates electric power directly, the output of which may be transformed by a power converter into a form that is suitable for use by the traction motor 206, the pump motor 219,220,221 or energy storage means 208.

The energy storage means 208 can be charged from a stationary electrical power source, e.g. when the work machine is parked, by plugging into a stationary power supply coupled to the power grid, as an alternative to charging with the power generator 203 during operation of the work machine 101.

The energy management system 301 may further comprise one or more environment sensors, for example, a pressure sensor or temperature sensor, so as to provide for environmental information that may be influence the overall control strategy. For example, the ambient temperature can influence the storage characteristics of the energy storage means 208, or the altitude sensed from ambient pressure can influence the operating characteristics of an internal combustion engine.

Furthermore, the operator could initiate the recording of driving pattern data over a particular work cycle and stop recording when the work cycle is completed, so as to establish baseline data for determining energy usage. However, typically the energy management system 301 operates automatically without the operator having to communicate.

In the embodiment above, a series hybrid electric vehicle (HEV) is used. However, a parallel HEV is alternatively used, wherein the tractive effort to propel the work machine is provided by a combination of shaft power produced by the traction motor 206, and shaft power produced by the power generator 203 and coupled to the wheels 117.

The invention claimed is:

1. A method for controlling a hybrid work machine during operation in a repeated work cycle of the work machine, the hybrid work machine comprising an energy storage means and a power consuming system, the power consuming system comprising a powertrain for propelling the work machine and as system for moving a work implement of the work machine, the work cycle comprising a route of the work machine and a movement of the implement, the method comprising controlling transfer of power from the energy storage means to the power consuming system and from the power consuming system to the energy storage means in the work machine according to a predetermined control strategy, which control strategy is adapted for characteristics of the work cycle and based on work cycle knowledge achieved from a previously performed lap of the specific work cycle, wherein the control strategy comprises information with regard to operating the work implement and the method comprises controlling operation of the work implement.

2. A method according to claim 1, wherein the control strategy comprises information that is indicative of an amount of energy required for a certain portion of the work cycle.

3. A method according to claim 2, wherein the energy information is based on a change in a work cycle travel path.

4. A method according to claim 2, wherein the energy information is based on a change of direction of a work cycle travel path in a horizontal plane.

5. A method according to claim 2, wherein the energy information is based on a change of ground inclination of a work cycle travel path.

6. A method according to claim 2, wherein the energy information is indicative of an end position of the work cycle.

7. A method according to claim 6, wherein the end position represents a loading position and/or an unloading position.

8. A method according to claim 1, comprising the step of controlling transfer of power from a power generator in response to the predetermined control strategy during operation of the work machine in the work cycle.

9. A method according to claim 8, wherein the power generator comprises an internal combustion engine.

10. A method according to claim 1, wherein the system for moving the work implement comprises a hydraulic system.

11. A method according to claim 1, comprising the step of determining at least one condition that is indicative of an amount of energy required for a certain portion of the work cycle, and establishing the energy control strategy on the basis of the energy condition.

12. A method according to claim 11, comprising the step of detecting at least one operational parameter during operation of the work machine in the work cycle in question, and determining the energy condition on the basis of a magnitude of the detected operational parameter.

13. A method according to claim 12, comprising the step of repeatedly detecting the at least one operational parameter.

14. A method according to claim 11, comprising the step of predicting at least part of the energy condition on the basis of pre-available information of the work cycle in question.

15. A method according to claim 14, wherein the pre-available information of the work cycle comprises a geographical map.

16. A method according to claim 11, comprising the step of using a satellite based system for establishing a travel path of the work cycle.

17. A method according to claim 1, wherein the control strategy comprises a plurality of consecutive control steps, wherein each step is indicative of a specific condition variation.

18. A method according to claim 1, wherein a travel path of the work cycle comprises a plurality of positions, wherein each position is indicative of a specific condition variation.

19. A non-transitory computer readable medium comprising a computer program comprising computer program segments for implementing the method as claimed in claim 1.

20. A computer program product comprising computer program segments stored on a non-transitory computer-readable medium for implementing the method as claimed in claim 1.

21. A control system for controlling a hybrid work machine during operation in a repeated work cycle of the work machine, the hybrid work machine comprising an energy storage means and a power consuming system, and the power consuming system comprising a powertrain for propelling the work machine and a system for moving a work implement of the working machine, the work cycle comprising a route of the work machine and a movement of the implement, the control system comprising means for controlling transfer of power from the energy storage means to the power consuming system and from the power consuming system to the energy storage means in the work machine according to a predetermined control strategy, which control strategy is adapted for the characteristics of the work cycle and based on work cycle knowledge achieved from a previously performed lap of the specific work cycle, wherein the control strategy comprises information with regard to operating the work implement and the control system is configured to control operation of the work implement.

22. A control system according to claim 21, wherein the work implement is moved via a hydraulic system.

23. A control system according to claim 21, wherein the energy storage means comprises a capacitor.

24. A control system according to claim 21, comprising means for determining at least one condition that is indicative of an amount of energy required for a certain portion of the work cycle, wherein the control strategy is based on the condition.

25. A control system according to claim 24, wherein the determination means is configured to detect at least one operational parameter during operation of the work machine in the work cycle in question.

26. A control system according to claim 24, comprising means for establishing the energy control strategy on the basis of the condition.

27. A work machine comprising a control system for controlling a hybrid work machine during operation in a repeated work cycle of the work machine, the hybrid work machine comprising an energy storage means and a power consuming system, and the power consuming system comprising a powertrain for propelling the work machine and a system for moving a work implement of the working machine, the work cycle comprising a route of the work machine and a movement of the implement, the control system comprising means for controlling transfer of power from the energy storage means to the power consuming system and from the power consuming system to the energy storage means in the work machine according to a predetermined control strategy, which control strategy is adapted for the characteristics of the work cycle and based on work cycle knowledge achieved from a previously performed lap of the specific work cycle, wherein the control strategy comprises information with regard to operating the work implement and the control system is configured to control operation of the work implement.

* * * * *